(12) United States Patent
Gustavsson et al.

(10) Patent No.: US 7,734,247 B2
(45) Date of Patent: Jun. 8, 2010

(54) CONFIGURABLE SERIAL MEMORY INTERFACE

(75) Inventors: Bengt Stefan Gustavsson, Helsingborg (SE); Henrik Borjesson, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 681 days.

(21) Appl. No.: 11/626,939

(22) Filed: Jan. 25, 2007

(65) Prior Publication Data
US 2008/0182618 A1    Jul. 31, 2008

(51) Int. Cl.
H04H 60/09    (2008.01)
H04B 5/00     (2006.01)
H04B 17/00    (2006.01)

(52) U.S. Cl. ............... 455/3.04; 455/41; 455/67.11; 455/405; 455/425; 455/426

(58) Field of Classification Search ............ 455/41, 455/67.11, 405, 426, 550.1, 564, 569.2, 574
See application file for complete search history.

(56) References Cited

U.S. PATENT DOCUMENTS

| | | | |
|---|---|---|---|
| 5,233,642 A * | 8/1993 | Renton | 455/405 |
| 6,377,825 B1 * | 4/2002 | Kennedy et al. | 455/569.2 |
| 6,973,305 B2 * | 12/2005 | McLean | 455/425 |
| 7,003,279 B2 * | 2/2006 | Nickum | 455/405 |
| 7,016,695 B1 * | 3/2006 | Bahai | 455/466 |
| 7,047,047 B2 * | 5/2006 | Acero et al. | 455/563 |
| 7,103,357 B2 * | 9/2006 | Kirani et al. | 455/426.1 |
| 7,283,841 B2 * | 10/2007 | Luke et al. | 455/556.1 |
| 7,283,850 B2 * | 10/2007 | Granovetter et al. | 455/570 |
| 7,373,121 B1 * | 5/2008 | Bahai | 455/161.2 |
| 7,406,303 B2 * | 7/2008 | Deng et al. | 455/260 |
| 7,433,710 B2 * | 10/2008 | Bodnar et al. | 455/556.1 |

(Continued)

FOREIGN PATENT DOCUMENTS

EP    1 293 931    3/2003

(Continued)

OTHER PUBLICATIONS

Memory Stick Standard, Memory Stick PRO Specification Summary -Non-Licensee version-, Dec. 2004, Sony Corporation.

(Continued)

*Primary Examiner*—William D Cumming
(74) *Attorney, Agent, or Firm*—Renner, Otto, Boisselle & Sklar, LLP

(57) ABSTRACT

A configurable serial interface for a mobile communications device is provided to access audio information (e.g., audio files) stored on a removable memory device. In normal operation, the mobile communications device accesses audio information stored on the removable memory source through a conventional serial interface located in the digital application processor and/or directly interfaced with the main processing device. The interface is configurable to change to a second interface (e.g., Serial Low-power Interconnect for Media or SLIMbus (SLIMbus)) after receiving a command to change the interface. The second interface generally utilizes significantly less power than the first interface because the main processing device is not utilized to convert the digital audio files stored on the removable memory device. Control of the first and/or second interface may be maintained by a control circuit used for controlling the main processing device.

21 Claims, 3 Drawing Sheets

U.S. PATENT DOCUMENTS

| | | | |
|---|---|---|---|
| 7,454,166 B2 * | 11/2008 | Patsiokas et al. | 455/3.06 |
| 7,466,993 B2 * | 12/2008 | Atkinson et al. | 455/557 |
| 7,489,923 B2 * | 2/2009 | Varanda | 455/418 |
| 7,499,686 B2 * | 3/2009 | Sinclair et al. | 455/223 |
| 2002/0032027 A1 | 3/2002 | Kirani et al. | 455/426 |
| 2002/0032042 A1 * | 3/2002 | Poplawsky et al. | 455/564 |
| 2002/0151276 A1 * | 10/2002 | Ito | 455/41 |
| 2004/0023686 A1 * | 2/2004 | King et al. | 455/550.1 |
| 2004/0063422 A1 * | 4/2004 | Nickum | 455/405 |
| 2004/0176147 A1 * | 9/2004 | Escalante | 455/574 |
| 2004/0266336 A1 * | 12/2004 | Patsiokas et al. | 455/3.04 |
| 2004/0266480 A1 * | 12/2004 | Hjelt et al. | 455/558 |
| 2005/0009563 A1 * | 1/2005 | Stenmark | 455/558 |
| 2005/0059352 A1 * | 3/2005 | McLean | 455/67.11 |
| 2005/0091425 A1 | 4/2005 | Wyatt et al. | |
| 2005/0113113 A1 * | 5/2005 | Reed | 455/456.3 |
| 2005/0153730 A1 * | 7/2005 | Turetzky et al. | 455/550.1 |
| 2005/0153740 A1 * | 7/2005 | Binzel et al. | 455/558 |
| 2005/0197158 A1 * | 9/2005 | Silverbrook et al. | 455/556.2 |
| 2005/0202804 A1 * | 9/2005 | Silverbrook et al. | 455/411 |
| 2005/0288044 A1 * | 12/2005 | Atkins et al. | 455/466 |
| 2006/0019655 A1 * | 1/2006 | Peacock | 455/426.1 |
| 2006/0035663 A1 * | 2/2006 | Cheng | 455/550.1 |
| 2006/0079291 A1 * | 4/2006 | Granovetter et al. | 455/563 |
| 2006/0128376 A1 * | 6/2006 | Alexis | 455/426.1 |
| 2006/0135151 A1 * | 6/2006 | Mu et al. | 455/426.1 |
| 2006/0252456 A1 * | 11/2006 | King et al. | 455/556.1 |
| 2006/0255964 A1 | 11/2006 | Wong et al. | |
| 2006/0293081 A1 * | 12/2006 | Overby | 455/557 |
| 2007/0010195 A1 * | 1/2007 | Brown et al. | 455/3.06 |
| 2007/0010286 A1 * | 1/2007 | Luke et al. | 455/556.1 |
| 2007/0010291 A1 * | 1/2007 | Deng et al. | 455/563 |
| 2007/0021144 A1 * | 1/2007 | Atkinson et al. | 455/556.1 |
| 2007/0032228 A1 * | 2/2007 | Varanda | 455/418 |
| 2007/0111756 A1 * | 5/2007 | Reed | 455/556.1 |
| 2007/0178828 A1 * | 8/2007 | Patel et al. | 455/3.06 |
| 2007/0191032 A1 * | 8/2007 | Doffman | 455/466 |
| 2007/0287493 A1 * | 12/2007 | Stephens | 455/550.1 |
| 2008/0009282 A1 * | 1/2008 | Weeresinghe | 455/432.3 |
| 2008/0026730 A1 * | 1/2008 | Appaji | 455/414.1 |
| 2008/0026746 A1 * | 1/2008 | Appaji | 455/426.1 |
| 2008/0032738 A1 * | 2/2008 | Boyer et al. | 455/556.1 |
| 2008/0045156 A1 * | 2/2008 | Sakhpara | 455/67.11 |
| 2008/0102885 A1 * | 5/2008 | Tu et al. | 455/553.1 |
| 2008/0119173 A1 * | 5/2008 | Nguyen | 455/414.1 |
| 2008/0119178 A1 * | 5/2008 | Peddireddy et al. | 455/418 |
| 2008/0182618 A1 * | 7/2008 | Gustavsson et al. | 455/557 |
| 2008/0227467 A1 * | 9/2008 | Barnes et al. | 455/456.2 |
| 2008/0233887 A1 * | 9/2008 | Singh | 455/73 |
| 2008/0233978 A1 * | 9/2008 | Batey et al. | 455/462 |
| 2008/0248813 A1 * | 10/2008 | Chatterjee | 455/456.2 |
| 2008/0248834 A1 * | 10/2008 | Chatterjee et al. | 455/557 |
| 2008/0254822 A1 * | 10/2008 | Tilley | 455/550.1 |
| 2008/0261581 A1 * | 10/2008 | Cai | 455/422.1 |
| 2008/0268854 A1 * | 10/2008 | Cai et al. | 455/444 |
| 2008/0268882 A1 * | 10/2008 | Moloney | 455/466 |
| 2008/0268896 A1 * | 10/2008 | Langlois et al. | 455/550.1 |
| 2008/0318616 A1 * | 12/2008 | Chipalkatti et al. | 455/550.1 |
| 2009/0011747 A1 * | 1/2009 | Wood et al. | 455/414.2 |
| 2009/0023475 A1 * | 1/2009 | Chang et al. | 455/557 |
| 2009/0042540 A1 * | 2/2009 | Bodnar et al. | 455/410 |
| 2009/0061762 A1 * | 3/2009 | Patsiokas et al. | 455/3.02 |
| 2009/0061763 A1 * | 3/2009 | Dillon et al. | 455/3.05 |
| 2009/0061858 A1 * | 3/2009 | Rajasimman et al. | 455/433 |
| 2009/0061859 A1 * | 3/2009 | Bengtsson | 455/433 |
| 2009/0061914 A1 * | 3/2009 | Cai | 455/466 |
| 2009/0068996 A1 * | 3/2009 | Bakker et al. | 455/414.1 |
| 2009/0069016 A1 * | 3/2009 | Zhao | 455/441 |
| 2009/0088089 A1 * | 4/2009 | Chandra et al. | 455/101 |
| 2009/0088188 A1 * | 4/2009 | Wormald et al. | 455/466 |
| 2009/0093234 A1 * | 4/2009 | Cai et al. | 455/411 |
| 2009/0093251 A1 * | 4/2009 | Cai et al. | 455/436 |
| 2009/0098902 A1 * | 4/2009 | Kong et al. | 455/550.1 |
| 2009/0104899 A1 * | 4/2009 | Bakker et al. | 455/417 |
| 2009/0111524 A1 * | 4/2009 | Basaralu | 455/559 |
| 2009/0117889 A1 * | 5/2009 | Varanda | 455/418 |
| 2009/0143049 A1 * | 6/2009 | Chen et al. | 455/412.2 |
| 2009/0143056 A1 * | 6/2009 | Tang et al. | 455/418 |
| 2009/0143078 A1 * | 6/2009 | Tu et al. | 455/456.3 |
| 2009/0149164 A1 * | 6/2009 | Cai | 455/414.2 |
| 2009/0149218 A1 * | 6/2009 | Chen et al. | 455/557 |
| 2009/0170447 A1 * | 7/2009 | Marlett et al. | 455/82 |
| 2009/0170498 A1 * | 7/2009 | Venkatasubramanian et al. | 455/422.1 |
| 2009/0170509 A1 * | 7/2009 | Cai et al. | 455/434 |
| 2009/0191911 A1 * | 7/2009 | Wilson | 455/556.1 |
| 2009/0197542 A1 * | 8/2009 | Buckley et al. | 455/70 |
| 2009/0203361 A1 * | 8/2009 | Huang et al. | 455/414.1 |
| 2009/0209205 A1 * | 8/2009 | Kramer et al. | 455/41.3 |

FOREIGN PATENT DOCUMENTS

| | | |
|---|---|---|
| GB | 2 373 887 | 10/2002 |
| WO | 01/43408 | 6/2001 |
| WO | 2004/046902 | 6/2004 |

OTHER PUBLICATIONS

International Preliminary Report on Patentability for International Application No. PCT/IB2007/002113 dated Aug. 6, 2009.

International Search Report and Written Opinion for International Application No. PCT/IB2007/002113 dated Dec. 7, 2007.

* cited by examiner

150

```
┌─────────────────────────────────────────┐
│ Receiving a Request for Audio Information│
│   Stored on a Removable Memory Device    │
│                  152                     │
└─────────────────────────────────────────┘
                    │
┌─────────────────────────────────────────┐
│ Transferring the Audio Information through a │
│      Configurable Serial Interface        │
│                  154                     │
└─────────────────────────────────────────┘
                    │
┌─────────────────────────────────────────┐
│ Receiving the Audio Information from a First │
│           or Second Interface             │
│                  156                     │
└─────────────────────────────────────────┘
                    │
┌─────────────────────────────────────────┐
│ Rendering the Received Audio Information on │
│  a Rendering Device in a User-Sensible    │
│                 Format                    │
│                  158                     │
└─────────────────────────────────────────┘
```

Figure 3

CONFIGURABLE SERIAL MEMORY INTERFACE

TECHNICAL FIELD OF THE INVENTION

The present invention relates to the field of wireless telephony. Specifically, aspects of the present invention relate to a system and method for accessing a removable memory device inserted into a mobile communications device to increase performance and battery life of the mobile communications device.

DESCRIPTION OF THE RELATED ART

Wireless telephony has drastically improved convenience and prevalence of telecommunications in modern society. Electronic equipment in the form of mobile communications devices have evolved from voice-only electronic devices to multi-functional electronic devices. For example, mobile communications devices in the form of mobile telephones may now function as electronic organizers, digital cameras, audio application players (e.g., MP3 players), video application players (e.g., video players), video game terminals, etc. Moreover, mobile communications devices are not only used for voice communications, but they also are used in a variety of other forms (e.g., instant messaging applications, sharing photographs, gaining access to information on the Internet, etc).

The extents to which these additional functions can be added to a mobile communications device are generally restricted by the amount of memory available on the mobile communications device. It is common today for mobile communication devices to include a port or an adapter to receive an external memory device. Such external memory devices take a variety of forms including, for example, Memory Stick®, compact flash (CF), secure digital (SD), mini SD, hard disk drive, etc. The amount of available memory stored on these removable memory devices varies from 256 megabytes to 2 gigabytes. Thus, the amount of available removable memory typically allows for adding additional applications and/or increased functionality to the mobile communications device.

With increased applications, functionality and multimedia content, however, there are increased power consumption demands on the mobile communications device due to the power consumed by the main processor of the mobile communications device during operation. For example, it is common for the external memory interface to be located in or directly interfaced to the main processing device. One drawback with such a configuration is that when power consumption is critical, for example during audio playback, the main processor expends substantial amounts of power to execute the audio playback. Thus, the power source for the mobile telephone, which is typically a rechargeable battery, uses a substantial amount of power on peripheral activities and/or applications, which leads to decreased battery life and available operating time. Another drawback is that it is not possible to put the main processing device into a reduced power mode (e.g., in a sleep mode) when peripheral activities and/or multimedia applications are being executed by the mobile communications device. Consequently, there is a need in the art for a system and method for a removable memory device to have a configurable serial output interface.

SUMMARY

One aspect of the present invention relates to a system and method for accessing a removable memory source inserted into a mobile communications device to increase performance the mobile communications device. In particular, a configurable serial interface is provided that is selectively operable to route audio information from the removable memory device in a first mode or second mode depending on the status of the processing device.

One aspect of the invention relates to mobile communications device comprising: a removable memory device housed at least partially within a port in the mobile communications device having a primary processing device, wherein the removable memory device includes audio information stored in a memory resident in the removable memory device; and a configurable serial interface in the mobile communications device, wherein the configurable serial interface is configured in a first mode to transfer the audio information from the removable memory device and output through a rendering device when the processing device is in an active power mode and the configurable serial interface is configured in a second mode to convert the audio information for output on the rendering device when the processing device is in a reduced power mode.

According to an aspect of the invention, the removable memory device is a compact flash memory device.

According to an aspect of the invention, the removable memory device is at least one selected from the group of a secure digital card, a mini secure digital card or a hard disk drive.

According to an aspect of the invention, in the first mode a clock signal, a data signal and a synchronization signal are utilized for converting the audio information for rendering on the audio rendering device.

According to an aspect of the invention, in the second mode a clock signal and a data signal are utilized for converting the audio information for rendering on the audio rendering device.

According to an aspect of the invention, the audio information is decoded by an audio decoder prior to converting the audio information from a digital signal to an analog signal for output to the audio rendering device in the second mode.

According to an aspect of the invention, the active power mode is full operational power supplied to the processing device.

According to an aspect of the invention, the reduced power mode is a sleep mode.

According to an aspect of the invention, the audio rendering device is a headset.

Another aspect of the invention relates to a method for rendering audio information stored on a removable memory device housed in a mobile communications device, the method comprising: receiving a request for audio information stored on a removable memory device; transferring the audio information to an audio rendering device through a configurable serial interface, wherein in a first mode the audio information is converted by a processing device operating above a predetermined rate; and in a second mode the audio information is converted by a separate converter when the processing device is operating below a predetermined rate; and rendering the audio information received from the first mode and/or the second mode through the audio rendering device in a user sensible format.

According to an aspect of the invention, further including transmitting a command to a control circuit for the processing device to operate a reduced level and configuring the transfer of audio information from the removable memory device from the first mode to the second mode.

According to an aspect of the invention, further including transmitting one or more rendering commands from the control circuit to control rendering of the audio information on the audio rendering device.

According to an aspect of the invention, in the first mode a clock signal, a data signal and a synchronization signal are utilized for converting the audio information for rendering on the audio rendering device.

According to an aspect of the invention, in the second mode a clock signal and a data signal are utilized for converting the audio information for rendering on the audio rendering device.

According to an aspect of the invention, the audio information is decoded by an audio decoder prior to converting the audio information from a digital signal to an analog signal for output to the audio rendering device in the second mode.

According to an aspect of the invention, the audio information is rendered on the audio rendering device through a headset.

Another aspect of the invention relates to a mobile communications device comprising: a removable memory device housed at least partially within a port in the mobile communications device having a primary processing device, wherein the removable memory device includes audio information stored in a memory resident in the removable memory device; a processing device for converting the audio information from a digital state to an analog state for rendering by an audio rendering device in a first mode; a converter for converting the audio information from the digital state to the analog state for rendering by the audio rendering device in a second mode; and a configurable serial interface selectively operable to route the audio information from the removable memory device in the first mode or second mode depending on the status of the processing device.

According to an aspect of the invention, in the first mode a clock signal, a data signal and a synchronization signal are utilized for converting the audio information for rendering on the audio rendering device.

According to an aspect of the invention, in the second mode a clock signal and a data signal are utilized for converting the audio information for rendering on the audio rendering device.

According to an aspect of the invention, the audio information is decoded by an audio decoder prior to converting the audio information from a digital signal to an analog signal for output to the audio rendering device in the second mode.

According to an aspect of the invention, when processing device is operating above a predetermined rate the configurable serial interface is operable in the first mode and when the processing device is operating below a predetermined rate the configurable serial interface is operable in the second mode.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 3 is an exemplary method in accordance with aspects of the present invention.

DETAILED DESCRIPTION OF EMBODIMENTS

Aspects of the present invention are directed to a system and method for accessing a removable memory source inserted into a mobile communications device to increase performance the mobile communications device. In particular, one aspect of the present invention relates to a configurable serial interface for a mobile communications device to access audio information (e.g., audio files) stored on a removable memory device. In normal operation, the mobile communications device accesses audio information stored on the removable memory source through a conventional serial interface located in the digital application processor and/or directly interfaced with the main processing device. The interface is configurable to change to a second interface (e.g., Serial Low-power Interconnect for Media or SLIMbus (SLIMbus)) after receiving a command to change the interface. The second interface generally utilizes significantly less power than the first interface because the main processing device is not utilized to convert the digital audio files stored on the removable memory device. Control of the first and/or second interface may be maintained by a control circuit used for controlling the main processing device.

Figure 1:
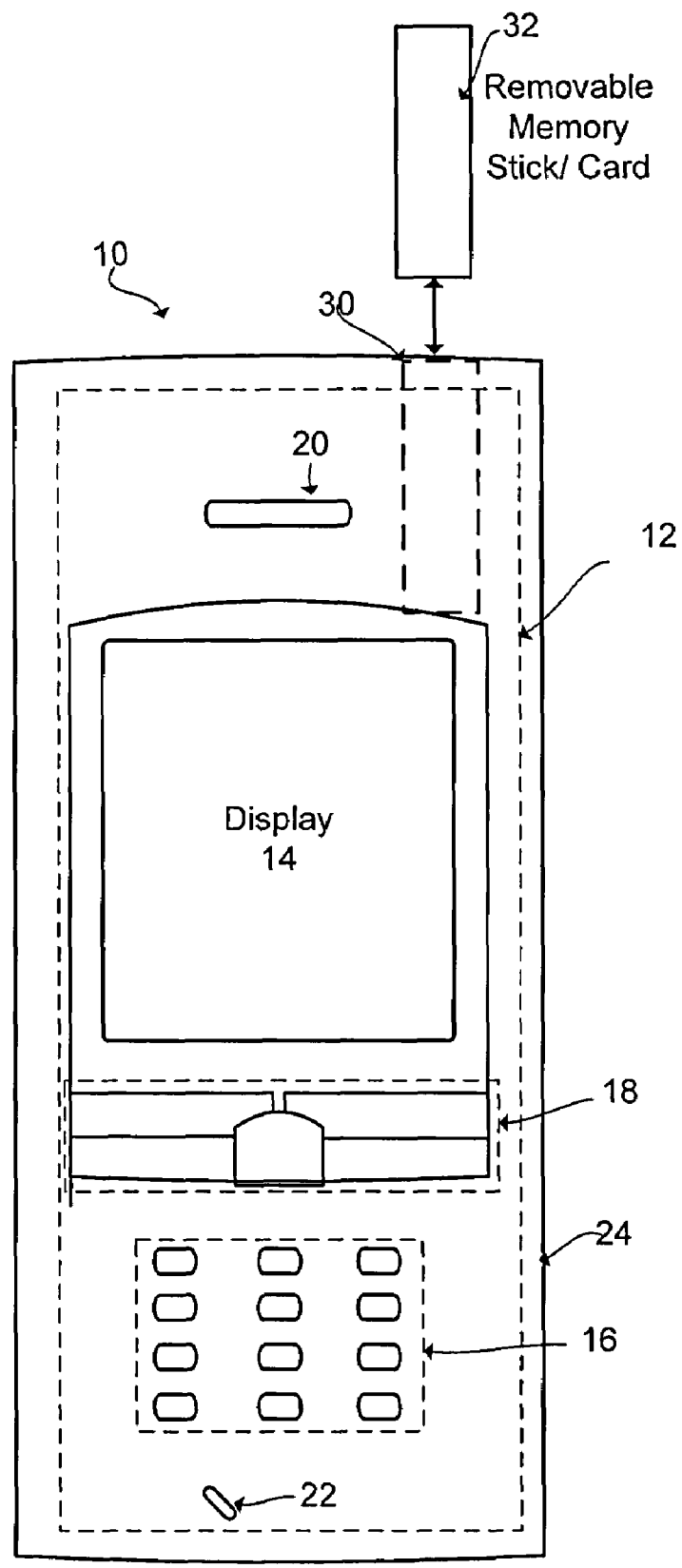
FIG. 1 is an exemplary block diagram of a portable communications device and removable memory device in accordance with aspects of the present invention.

Referring to FIG. 1, electronic equipment 10 is shown in accordance with one aspect of the present invention. The electronic equipment 10 in the exemplary embodiment is a mobile communications device and will be referred to as the mobile communications device 10. The mobile communications device 10 is shown as having a "brick" or "block" design type housing, but it will be appreciated that other type housings, such as clamshell housing or a slide-type housing, may be utilized without departing from the scope of the invention.

As illustrated in FIG. 1, the mobile communications device 10 may include a user interface 12 (identified by dotted lines) that enables the user easily and efficiently to perform one or more communication tasks (e.g., identify a contact, select a contact, make a telephone call, receive a telephone call, request multimedia content from a remote server, etc). The user interface 12 of the mobile communications device 10 generally includes one or more of the following components: a display 14, an alphanumeric keypad 16, function keys 18, a navigation tool 19, a rendering device 20 (e.g., a speaker and/or a headset), and/or a microphone 22.

The mobile communications device 10 includes a display 14. The display 14 displays information to a user such as operating state, time, telephone numbers, contact information, various navigational menus, status of one or more functions, etc., which enable the user to utilize the various features of the mobile communications device 10. The display 14 may also be used to visually display content accessible by the mobile communications device 10. The displayed content may include E-mail messages, audio and/or video presentations stored locally in memory 24 (FIG. 2) of the mobile communications device 10 and/or stored remotely from the mobile communications device 10 (e.g., on a remote storage device, a mail server, remote personal computer, etc.). Such presentations may originate, be derived and/or downloaded from any source. For example, from multimedia files downloaded from a remote server, from multimedia files received through E-mail messages, including audio and/or video files, from a received mobile radio and/or television signal, etc. The audio component may be broadcast to the user with a speaker 20 of the mobile communications device 10. Alternatively, the audio component may be broadcast to the user though a headset speaker (not shown).

The mobile communications device 10 further includes a keypad 16 that provides for a variety of user input operations. For example, the keypad 16 may include alphanumeric keys for allowing entry of alphanumeric information such as user-friendly identification of contacts, user-friendly identification of contacts, E-mail addresses, distribution lists, telephone numbers, phone lists, contact information, notes, etc. In addition, the keypad 16 typically may include special function keys such as a "call send" key for transmitting an E-mail, initiating or answering a call, and a "call end" key for ending, or "hanging up" a call. Special function keys may also include menu navigation keys, for example, for navigating through a menu displayed on the display 14 to select different telephone functions, profiles, settings, etc., as is conventional. Other keys associated with the mobile communications device 10 may include a volume key, audio mute key, an on/off power key, a web browser launch key, an E-mail application launch key, a camera key, etc. Keys or key-like functionality may also be embodied as a touch screen associated with the display 14.

The mobile communications device 10 also includes conventional call circuitry that enables the mobile communications device 10 to establish a call, transmit and/or receive E-mail messages, and/or exchange signals with a called/calling device, typically another mobile communications device or landline telephone. However, the called/calling device need not be another telephone, but may be some other electronic device such as an Internet web server, E-mail server, content providing server, etc.

The mobile communications device 10 further includes a port 30 for receiving a removable memory device 32 (e.g., a memory stick, memory card, hard disk drive, etc.). The removable memory device 32, which is described in detail below, is a self-contained electronic memory unit that provides additional data storage capacity when connected to the mobile communications device 10 through the port 30. The removable memory device 32 may be any type of removable memory device. Exemplary removable memory devices include Memory Stick®, secure digital (SD), miniSD, compact flash, hard disk drive, etc. As used herein, the phrase "removable memory device" may also be used interchangeably with "external memory device". An unlimited number of removable memory devices 32 may be used with a given mobile communications device 10 to provide the mobile communications device 10 with as much data storage capacity as necessary. Preferably, the removable memory device 32 can be manually inserted into and removed from the port 30 by the user. In other words, the removable memory device 32 is typically plugged into the port 30 and held there by friction. A latching mechanism (not shown) may be also included for securing the removable memory device 32 in the port 30 until released by the user.

Figure 2:
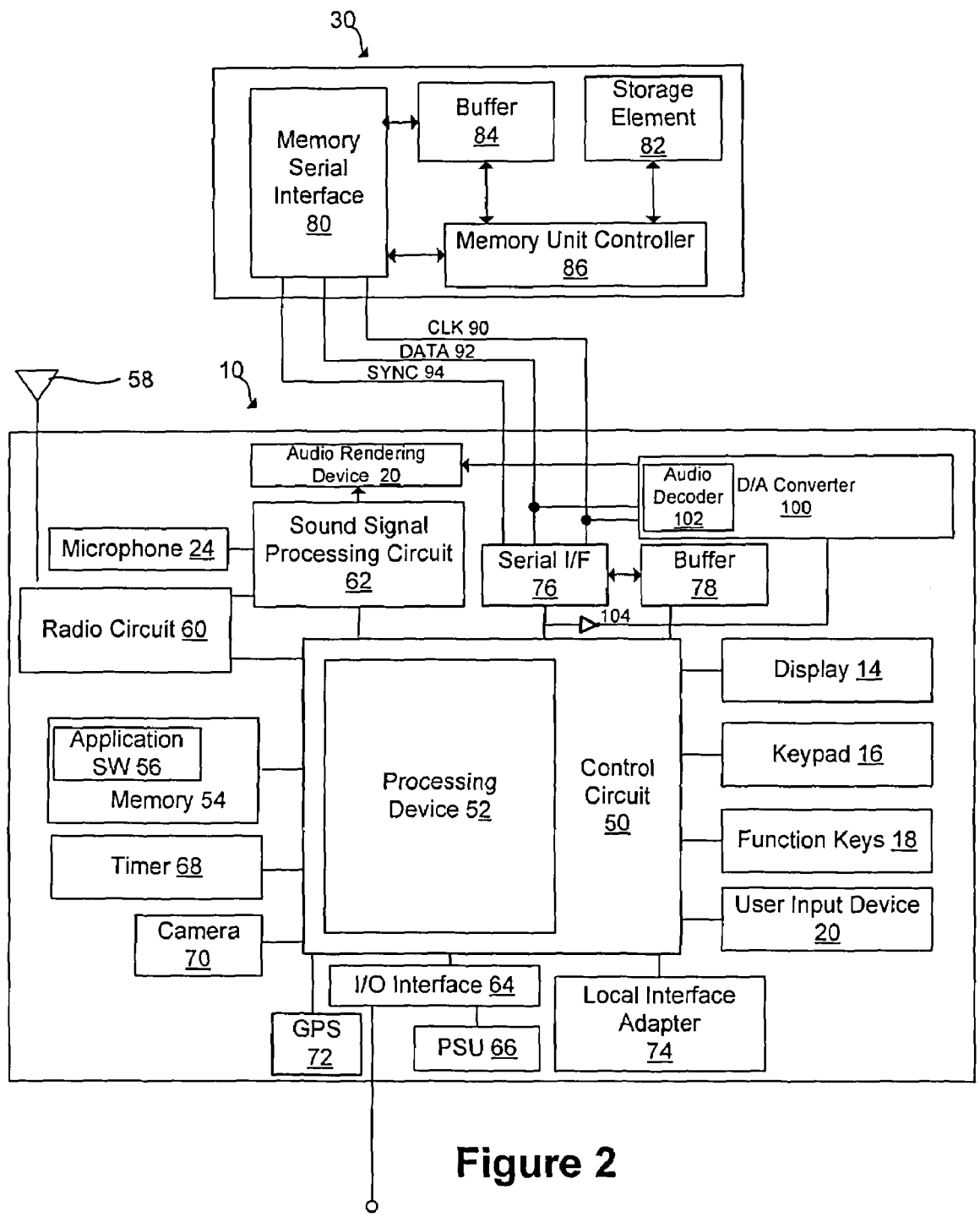
FIG. 2 is an exemplary schematic diagram of a portable communications device and a removable memory device in accordance with aspects of the present invention.

Referring to FIG. 2, an exemplary functional block diagram of the mobile communications device 10 is illustrated. The mobile communications device 10 includes a primary control circuit 50 that is configured to carry out overall control of the functions and operations of the mobile communications device 10. The control circuit 50 may include a processing device 52, such as a CPU, microcontroller or microprocessor. The processing device 52 executes code stored in a memory (not shown) within the control circuit 50 and/or in a separate memory, such as memory 54, in order to carry out operation of the mobile communications device 10. The processing device 52 is generally operative to perform all of the functionality disclosed herein. For example, the processing device 52 is coupled to the storage element (e.g., memory 54) for decoding and/or post-processing received multimedia content in normal operating mode. For example, in normal operating mode, the removable memory device 32 will have a serial interface with the processing device 52, as discussed below. The memory 54 may be, for example, a buffer, a flash memory, a hard drive, a removable media, or some other type of volatile and/or a non-volatile memory. In addition, the processing device 52 executes code to carry out various functions of the mobile communications device 10.

The mobile communications device 10 includes an antenna 58 coupled to a radio circuit 60. The radio circuit 60 includes a radio frequency transmitter and receiver for transmitting and receiving signals via the antenna 58 as is conventional. The mobile communications device 10 generally utilizes the radio circuit 60 and antenna 58 for voice, Internet and/or E-mail communications over a mobile telephone network.

The mobile communications device 10 further includes a sound signal processing circuit 62 for processing the audio signal transmitted by/received from the radio circuit 60. Coupled to the sound processing circuit 62 are the speaker 22 and a microphone 24 that enable a user to listen and speak via the mobile communications device 10 as is conventional. The radio circuit 60 and sound processing circuit 62 are each coupled to the control circuit 50 so as to carry out overall operation of the mobile communications device 10.

The mobile communications device 10 also includes the aforementioned display 14 and keypad 16 coupled to the control circuit 50. The mobile communications device 10 further includes an I/O interface 64. The I/O interface 64 may be in the form of typical mobile communications device I/O interfaces, such as a multi-element connector at the base of the mobile communications device 10. As is typical, the I/O interface 64 may be used to couple the mobile communications device 10 to a battery charger to charge a power supply unit (PSU) 66 within the mobile communications device 10. In addition, or in the alternative, the I/O interface 64 may serve to connect the mobile communications device 10 to a wired personal hands-free adaptor, to a personal computer or other device via a data cable, etc. The mobile communications device 10 may also include a timer 68 for carrying out timing functions. Such functions may include timing the durations of calls, generating the content of time and date stamps, etc.

The mobile communications device 10 may include various built-in accessories, such as a camera 70 for taking digital pictures. Image files corresponding to the pictures may be stored in the memory 24. In one embodiment, the mobile communications device 10 also may include a position data receiver 72, such as a global positioning satellite (GPS) receiver, Galileo satellite system receiver or the like. The mobile communications device 10 may also include one or more wireless network adapters 74 for establishing wireless communications with one or more remote devices. The wireless network adapter 74 may be any suitable wireless network adapter. For example, wireless network adapter 74 may be a wireless local area network (WLAN) adapter, a Bluetooth adapter, a near field communication adapter, etc.

The mobile communications device 10 also includes a serial interface 76 for electronic communication between the mobile communications device 10 and the connected removable memory device 30. The serial interface 76 is located in, or connected to, the port 30 that receives the removable memory device 30. In general there is a buffer 78 located between the processing device 52 and the serial interface 76. The buffer 78 buffers the data being transferred between the processing device 52 and the serial interface 76. The processing device 52 generally controls operation of the serial interface 76, as well as the buffer 78.

The external memory device 30 generally includes a serial interface 80 for connection to the serial interface 76 of the mobile communications device 10. A storage element 82 is located aboard the external memory device 30 for data storage. Preferably, the storage element 82 is a flash-type memory, but any memory source may be used for the storage element (e.g., secure digital, miniSD, hard disk drive, etc.). A buffer 84 is provided between the serial interface 80 and the storage element 82 to buffer data being transferred to and from the memory device 30. A memory unit controller 86 coordinates and controls the operation of the serial interface 80, the storage element 82, and the buffer 84.

A conventional interface between the phone serial interface 76 and the memory serial interface 80 generally includes three separate signal paths. The first signal path is a clock signal line 90. On the clock signal line 90, the mobile communication device 10 provides a clock signal to time the transmission of data from the storage element 82 to mobile communication device 10. This clock signal 90 is generally needed when the removable memory device 30 is transmitting and/or allowing access to data to the mobile communications device 10. A synchronization line 94 (also referred to as a control line) also connects the mobile communications device 10 and removable memory device 30. The synchronization line 94 generally carries a control signal that activates the removable memory device 30 to receive or transmit data. The synchronization line 94 may be used interchangeably with the bus state signal line as defined in the Memory Stick Standard, which is incorporated herein by reference. The bus state signal line is generally used in serial and/or parallel protocols and is classified into four states depending on the attributes and the transfer direction of the data.

In addition, a main data line 92 is provided over which data is communicated between the mobile communications device 10 and the removable memory device 30. Commands from the mobile communications device 10 regarding the storage or retrieval of data in the removable memory device 30 are also transmitted to the removable memory device 30 on the main data line 92. Such commands and/or controls are generally controlled by the main processing device 52.

Additionally, if the removable memory device 30 is busy executing a command from the mobile communications device 10, a busy signal can be transmitted over the main data line 92 to the mobile communications device 10 to advise the mobile communications device 10 of the unavailable status of the removable memory device 30. Similarly, if the removable memory device 30 needs to interrupt the operation of the processing device 52 and/or control circuit 50, an interrupt signal can be sent over the main data line 92. One of ordinary skill in the art will readily appreciate that a resistor (not shown) may be connected between ground and the main data line 92 within the mobile communications device 10. This resistor may be a pull-up or pull-down resistor that brings the main data line 92 to a predetermined voltage in the absence of any data signal being transmitted on the main data line 92. The predetermined voltage to which the main data line 92 is generally determined by the operating voltage of the mobile communications device 10 and the characteristics of the resistor.

The conventional interface between the phone serial interface 76 and the memory serial interface 80 relies on the baseband process (e.g. processing device 52) and associated control circuitry (e.g. control circuit 50) for operation. Such devices generally consume much power. As stated above, one aspect of the present invention is to utilize a second interface between the mobile communications device 10 and the removable memory device 30 when the mobile communications device is in a standby mode, a sleep mode and/or in a reduced powered mode and user desires to listen to audio content stored on the removable memory device 30.

Referring back to FIG. 2, in addition to routing the clock signal 90 and the data signal 92 to the serial interface 76, the clock signal 90 and the data signal 92 are also routed to a digital to audio (D/A) converter 100. The D/A converter 100 generally receives clock signal 90 and data signal 92, which are digital and converts the signals to analog for output to an audio rendering device 20 (e.g., a speaker and/or a headset). If the stored digital information is encoded, the clock signal 90 and the data signal 92 may be decoded by audio decoder 102 and routed through the D/A converter 100 to the audio rendering device 100 for output to the user in a user sensible format.

Thus, a configurable serial output interface is provided that allows conventional output of audio when the processing device 52 and/or control circuit 50 is running at operational speed and allows for a second interface that operates substantially independently of the processing device 52 and/or control circuit 50. The second interface may still receive commands from the control circuit 50 and the processing device 52, but the vast majority of data conversion associated with converting the digital audio content stored on the removable memory device 30 is processed by dedicated hardware that uses substantially less power than the processing device 52.

Control of the configurable serial output may be achieved in a number of ways. Referring to FIG. 2, an inverter 104 may be coupled between an enable pin of the serial interface 76 and the D/A converter 100. In operation, when the serial interface 76 is disabled, the D/A converter 100 is enabled, which effectively routes the clock signal 90 and the data signal 92 to the D/A converter 100 and to the audio rendering device 20. The control of the configurable serial output may be controlled by software (e.g., by a user entered command) and/or hardware. For example, the user may select a command to put the mobile communications device in a reduced power mode (e.g. a sleep mode). The user may also desire to listen to audio content stored on the removable memory device. In order to reduce power consumption and therefore conserve battery life of the mobile communications device 10, the second interface may be selected. One of ordinary skill in the art will readily appreciate that control of the encoding and/or decoding will have to be done by hardware acceleration and/or some other manner to utilize the full power saving advantages of the configurable serial output interface.

An exemplary method 150 for rendering audio information stored on a removable memory device housed in a mobile communications device is illustrated in FIG. 3. The exemplary method 150 includes at step 152 receiving a request for audio information stored on a removable memory device. The request may originate from any source. For example a user may select audio information stored on the removable memory device 30. A software application operating on the mobile communications device 10 may select audio information stored on the removable memory device 30. A At step 154, the audio information is transferred to an audio rendering device 20 through a configurable serial interface. The configurable serial interface transfers the audio information to first interface for processing in a first mode when the processing device is operating above a predetermined rate. The configurable serial interfaces transfers the audio information to a second interface for processing in a second mode for processing by a separate converter when the processing device is operating below the predetermined rate. The predetermined threshold may be any reduced power mode. For example, when the processing device 52 is operating at its normal processing rate, any step down in power by power management software and/or user configured power settings (e.g., due to user inactivity) may result in a reduced power mode. In addition, a command to the control circuit 50 for the processing device 52 to operate a reduced level may also trigger operation in the second mode.

At step 156, the audio information is received from the first mode or the second mode. At step 158, the received audio information is rendered through the audio rendering device 20 in a user sensible format. Generally, the user sensible format is audible output from a speaker and/or headset.

As stated above, control signals for the configurable serial bus operating in the first and/or second mode may be controlled by the control circuit 50 or some other control mechanism. Likewise, the control circuit 50 may also be used to select audio content, fast forward, rewind, skip and provide all necessary functionality generally associated with playing audio content on a portable device. Typically, the user may manifest his or her intent through user input devices (e.g., display 14, keypad 16, function keys 18, navigation bar 19, etc.) and application software 56, which provides a user interface to control such parameters.

With the ability to write data to and retrieve data from an unlimited number of removable memory devices 30, the mobile communications device 10 can provide an expanded range of functions and features not available with conventional wireless telephone units. Aspects of the present invention also improve the functionality by providing a serial interface that utilizes low power consumption when the processing device 52 is a reduced power state.

Additionally, the mobile communications device 10 can now be used as a personal audio device to play music or other audio programming stored on the removable memory device 30. For this purpose, the rendering device 20 may include a connection to a headset. The headset may be any of a variety of configurations including two speakers connected by a headband that rests over the user's head; two speakers that are inserted and held in the user's ears; or one or two speakers that are hooked to, clipped to or hung from the user's ears. The headset may also include a microphone so as to be usable to conduct telephone calls using the wireless telephone unit.

With the headset provided as a means of outputting an audio signal that a user can listen to, the mobile communications device 10 can store audio information (e.g. music) in a digital format in the electronic storage 82 of the removable memory device 30. As one of ordinary skill in the art will readily appreciate, an enormous amount of audio information may be stored on the removable memory device 30 depending on the amount of memory contained in the removable memory device 32. The mobile communications device 10 can then simply retrieve the recorded audio signal from the removable memory device 30 and reproduce the audio signal as sound through the rendering device 20 (e.g., speaker and/or headset). Preferably, the audio stored in the removable memory device is compressed using MP3 or some other compression algorithm to maximize storage space. As stated above, the mobile communications device 10 will generally include encoding and/or decoding hardware and/or software to encode and/or decode the audio storing and/or rendering.

Specific embodiments of the invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A mobile communications device comprising:
a removable memory device housed at least partially within a port in the mobile communications device having a primary processing device, wherein the removable memory device includes audio information stored in a memory resident in the removable memory device; and a configurable serial interface in the mobile communications device, wherein the configurable serial interface is configured in a first mode to transfer the audio information from the removable memory device and output through a rendering device when the processing device is in an active power mode and the configurable serial interface is configured in a second mode to convert the audio information for output on the rendering device when the processing device is in a reduced power mode.

2. The mobile communications device of claim 1, wherein the removable memory device is a compact flash memory device.

3. The mobile communications device of claim 1, wherein the removable memory device is at least one selected from the group of a secure digital card, a mini secure digital card or a hard disk drive.

4. The mobile communications device of claim 1, wherein in the first mode a clock signal, a data signal and a synchronization signal are utilized for converting the audio information for rendering on the audio rendering device.

5. The mobile communications device of claim 4, wherein in the second mode a clock signal and a data signal are utilized for converting the audio information for rendering on the audio rendering device.

6. The mobile communications device of claim 5, wherein the audio information is decoded by an audio decoder prior to converting the audio information from a digital signal to an analog signal for output to the audio rendering device in the second mode.

7. The mobile communications device of claim 1, wherein the active power mode is full operational power supplied to the processing device.

8. The mobile communications device of claim 1, wherein the reduced power mode is a sleep mode.

9. The mobile communications device of claim 1, wherein the audio rendering device is a headset.

10. A method for rendering audio information stored on a removable memory device housed in a mobile communications device, the method comprising:
receiving a request for audio information stored on a removable memory device;
transferring the audio information to an audio rendering device through a configurable serial interface, wherein in a first mode the audio information is converted by a processing device operating above a predetermined rate; and in a second mode the audio information is converted by a separate converter when the processing device is operating below a predetermined rate; and
rendering the audio information received from the first mode and/or the second mode through the audio rendering device in a user sensible format.

11. The method of claim 10 further including transmitting a command to a control circuit for the processing device to operate a reduced level and configuring the transfer of audio information from the removable memory device from the first mode to the second mode.

12. The method of claim 10 further including transmitting one or more rendering commands from the control circuit to control rendering of the audio information on the audio rendering device.

13. The method of claim 10, wherein in the first mode a clock signal, a data signal and a synchronization signal are utilized for converting the audio information for rendering on the audio rendering device.

14. The method of claim 13, wherein in the second mode a clock signal and a data signal are utilized for converting the audio information for rendering on the audio rendering device.

15. The method of claim 14, wherein the audio information is decoded by an audio decoder prior to converting the audio information from a digital signal to an analog signal for output to the audio rendering device in the second mode.

16. The method of claim 10, wherein the audio information is rendered on the audio rendering device through a headset.

17. A mobile communications device comprising:
a removable memory device housed at least partially within a port in the mobile communications device having a primary processing device, wherein the removable memory device includes audio information stored in a memory resident in the removable memory device;
a processing device for converting the audio information from a digital state to an analog state for rendering by an audio rendering device in a first mode;
a converter for converting the audio information from the digital state to the analog state for rendering by the audio rendering device in a second mode; and
a configurable serial interface selectively operable to route the audio information from the removable memory device in the first mode or second mode depending on the status of the processing device.

18. The mobile communications device of claim 17, wherein in the first mode a clock signal, a data signal and a synchronization signal are utilized for converting the audio information for rendering on the audio rendering device.

19. The mobile communications device of claim 18, wherein in the second mode a clock signal and a data signal are utilized for converting the audio information for rendering on the audio rendering device.

20. The mobile communications device of claim 19, wherein the audio information is decoded by an audio decoder prior to converting the audio information from a digital signal to an analog signal for output to the audio rendering device in the second mode.

21. The mobile communications device of claim 20, wherein when the processing device is operating above a predetermined rate the configurable serial interface is operable in the first mode and when the processing device is operating below a predetermined rate the configurable serial interface is operable in the second mode.

* * * * *